United States Patent [19]

Moser et al.

[11] 4,402,030
[45] Aug. 30, 1983

[54] ELECTROSTATIC VOLTAGE CONTROL CIRCUIT

[75] Inventors: Richard A. Moser, Toledo, Ohio; J. Thomas Schaffer, Temperance, Mich.; Richard Weinstein, Toledo, Ohio

[73] Assignee: Champion Spark Plug Company, Toledo, Ohio

[21] Appl. No.: 350,498

[22] Filed: Feb. 19, 1982

[51] Int. Cl.³ .............................................. H02H 3/08
[52] U.S. Cl. .................................... 361/93; 118/671; 361/42; 361/235
[58] Field of Search ............... 361/42, 49, 93, 226, 361/227, 228, 235; 118/665, 671

[56] References Cited

U.S. PATENT DOCUMENTS

| | | | |
|---|---|---|---|
| 2,509,277 | 0/1950 | Ransburg et al. | 91/18 |
| 2,650,329 | 0/1953 | Orndoff . | |
| 3,048,498 | 0/1962 | Juvinall et al. | 117/93 |
| 3,641,971 | 0/1972 | Walberg | 118/8 |
| 3,851,618 | 0/1974 | Bentley | 118/7 |
| 3,875,892 | 0/1975 | Gregg et al. | 118/4 |
| 3,894,272 | 0/1975 | Bentley . | |
| 4,075,677 | 0/1978 | Bentley | 361/93 |
| 4,187,527 | 0/1980 | Bentley | 361/235 |

FOREIGN PATENT DOCUMENTS 2077006 12/1981 United Kingdom .

Primary Examiner—Harry E. Moose, Jr.
Attorney, Agent, or Firm—Oliver E. Todd, Jr.

[57] ABSTRACT

An improved control circuit for protecting a high voltage DC electrostatic system from arcing by removing the high voltage from the electrostatic system under incipient arcing conditions. A signal having a voltage proportional to the instantaneous high voltage current in the electrostatic system is established. DC components and unwanted noise and unwanted AC components are removed from the signal to leave only signal components relating to the rate of change of the current in the high voltage system and information indicative of incipient arcing conditions. When the remaining signal exceeds a predetermined reference level, high voltage is removed from the electrostatic system.

10 Claims, 5 Drawing Figures

ELECTROSTATIC VOLTAGE CONTROL CIRCUIT

BACKGROUND OF THE INVENTION

This invention relates to an improved control circuit for a high voltage DC power supply and more particularly to an improved control circuit which detects incipient arcing between a high voltage electrode, such as a charging electrode in an electrostatic coating system, and a grounded object and shuts off the high voltage power supply and grounds the electrode prior to arcing.

Electrostatic coating systems generally comprise a high voltage DC power source which is connected between a grounded object which is to be coated and a spray gun or similar device which directs an electrostatically charged atomized liquid coating or an electrostatically charged cloud of particulate coating material towards the object. There is a danger of fire or explosion when operating electrostatic coating systems. This danger exists due to the flammability of solvents within liquid coatings and the flammability of clouds of particulate coatings along with the risk of ignition by a spark between the coating apparatus and electrical ground. Typically, objects to be coated are conveyed past a fixed or reciprocating coating applicator. If the objects move too close to the coating applicator or should swing on the conveyor, a spark may occur between the coating applicator and the grounded object possibly resulting in a fire or an explosion.

Various approaches have been used in the past to prevent arcing from occurring in electrostatic coating systems. One external method for preventing fires or explosions involves the use of trip or sensing wires or photo detection devices. When a grounded object moves too close to the high voltage, the external sensing device is triggered and causes the high voltage at the power supply to be shut off while the charge is removed from the spray device by connecting it to ground. Another external system involves the use of an infrared sensing device to detect flames after a fire has occurred. Gases such as Freon then are released in the ignition area in order to quench the flames.

Another approach for reducing the risk of fire or explosion is to use an internal control circuit. One such control circuit comprises a very high value resistance connected in series between the high voltage power source and the coating material charging electrode. In the event of an incipient arc, the resistor, which may be on the order of five or six hundred megohms, limits available energy to a level insufficient for producing ignition. However, when an object approaches the spray gun or coating implement during normal spraying operations and there is a normal current increase, there will be a voltage drop across the high value resistor which results in a lower voltage at the spray tip or material charging electrode. This type of approach has lower charging levels of the spray or coating material and, consequently, a lower transfer efficiency of the coating material to the target or object being coated than a non-resistive power supply.

Another internal safety method is embodied in a feedback system. The current in the ground leg of the high voltage power supply is utilized to monitor the output current in the high voltage output line to the spray gun. One such use of this method is seen in an overcurrent shut down circuit. Such systems have been in use for over 15 years in the electrostatic coating field. The current within the ground leg of the high voltage DC circuit passes through a resistor which produces a low voltage signal proportional to the current. When the low voltage signal reaches a preset reference level which is used to indicate an incipient arc condition, the input voltage to the high voltage producing circuit is interrupted and, simultaneously, the high voltage output and spray device are grounded through the use of relays, solenoids or pneumatic switches. A circuit of this type works quite well where ther is a gradual current increase in the high voltage circuit until the preset trip current is reached. However, the circuit will not respond sufficiently fast to a rapid change in conditions, such as may occur when an object swinging on a conveyor is moved past an electrostatic spray gun. Also, a control of this type does not operate well where a number of spray guns are operated from a single high voltage power source. The control circuit must be set sufficiently high so as not to shutdown the power supply during normal maximum current loads from each of the spray guns. When an incipient arc exists at only one of the spray guns and the currents to the remaining spray guns is less than their maximum permissable currents, the circuit may not shut down the power supply even though incipient arcing exists.

An improved feedback control system for a high voltage power supply is illustrated, for example, in U.S. Pat. Nos. 3,851,618, 3,875,892, 3,894,272, 4,075,677 and 4,187,527. The improved system periodically samples the discrete DC current level in the high voltage circuit and stores each sample for a specific time interval. Each stored sample is compared to the next periodic sample. The difference between the two samples over the predetermined sampling timed interval represents a rate of change of the current in the high voltage circuit, or the di/dt. If the rate of change of the DC current exceeds a preset rate, the control circuit disconnects or shuts down the high voltage power supply and simultaneously grounds the high voltage output. This circuit is operated in conjunction with the above described overcurrent limiting circuit which shuts down the power supply when some predetermined maximum current occurs within the high voltage circuit. A control circuit which measures the rate of current change or the di/dt is a significant improvement over prior art high voltage control circuits for preventing arcing or sparking. However, the circuit does not always respond sufficiently fast to a sudden and very rapid current change or to a relatively small current change such as occurs when a small object moves rapidly towards an electrostatic spray gun. Another situation where response may be inadequate is when a small grounded projection extends from a large object which is being conveyed past an electrostatic coater. The current level within the high voltage system is determined primarily by the large mass of the object and the small grounded projection may move within arcing distance from the coating apparatus before the circuit can respond. This is particularly true in systems which look at the rate of change in current over a period of time rather than constantly looking at the instantaneous current within the system. Another problem with the di/dt method is when a grounded object moves very slowly to within proximity of the electrostatic coating apparatus and may even come to rest at the edge of the arcing distance. The di/dt at this time is not of practical use since the sensitivity setting to recognize such a condition would cause continuous false shutdown to the production system.

Even more basic is the fact that the above condition has barely any change in current with time until arcing actually occurs.

SUMMARY OF THE INVENTION

According to the present invention, an improved control circuit is provided for a high voltage DC power supply, such as a power supply of the type used for charging coating materials in an electrostatic coating system, for shutting down the power supply when incipient arcing conditions occur. The control circuit continuously monitors and responds to instantaneous changes in the AC component of the DC current and is used in combination with a prior art system which shuts down the high voltage power supply in response to an increase in current which exceeds a preset current level.

The control circuit of the present invention operates in response to the voltage appearing across a resistor placed in the low voltage ground return path for the high voltage power supply. Typically, the high voltage power supply for an electrostatic coating system includes a high frequency oscillator which drives the primary winding of a high voltage transformer. The high voltage output from the transformer is applied through a capacitor-diode ladder network which rectifies and multiplies the output from the transformer to a very high DC voltage which may be on the order of from 40 KV (kilovolt) to 150 KV. The voltage appearing across the resistor in the ground return leg for the high voltage circuit is primarily a DC signal having superimposed thereon a low level AC ripple which is a harmonic of the frequency at which the primary winding of the power transformer is excited. In addition, other high frequency noise appears across the current sensing resistor, for example, short duration pulses are superimposed on the voltage across the current sensing resistor under incipient arcing conditions. During incipient arcing conditions, or immediately prior to the occurrence of an arc, there is an increased corona discharge caused by ionization of the air surrounding the coating applicator nozzle caused by the voltage gradient exceeding a certain critical value. The corona discharge produces irregular current spikes of very short duration.

According to the present invention, the control circuit applies the voltage signal from the current sensing resistor through an AC coupling capacitor and a low pass filter, which remove the DC component, to the non-inverting input of a differential amplifier. The same signal from the low pass filter is applied through a normally forward biased diode to the inverting input of the differential amplifier. During steady state outputs from the high voltage power supply, the inputs to the differential amplifier are subtractive and cancel one another. On the other hand, when a current change or di/dt occurs in the output from the high voltage power supply or when incipient arcing is present, a signal passes through the differential amplifier and through a band pass filter to an operational amplifier. The output of the operational amplifier is compared with a preset reference voltage. When an incipient arc is present or when the high voltage output current changes at a predetermined rate, the signal applied from the operational amplifier to the comparator will exceed the reference voltage, thereby causing the comparator to trigger a switch to shut down the high voltage power supply and also to ground the output from the high voltage power supply and the electrostatic coating apparatus to remove the charge and to prevent arcing. Since the circuit continuously monitors instantaneous changes in the output current of the high voltage power supply, it rapidly responds both to the di/dt and to irregular very short duration current pulses occurring under incipient arcing conditions to which prior art control circuits would not adequately respond.

Accordingly, it is an object of the invention to provide an improved safety control circuit for a high voltage DC power supply.

Another object of the invention is to provide an improved control circuit for shutting down a high voltage DC power supply for an electrostatic system under incipient arcing conditions.

Other objects and advantages of the invention will become apparent from the following detailed description, with reference being made to the accompanying drawings.

DESCRIPTION OF THE PREFERRED EMBODIMENTS

Figure 1:
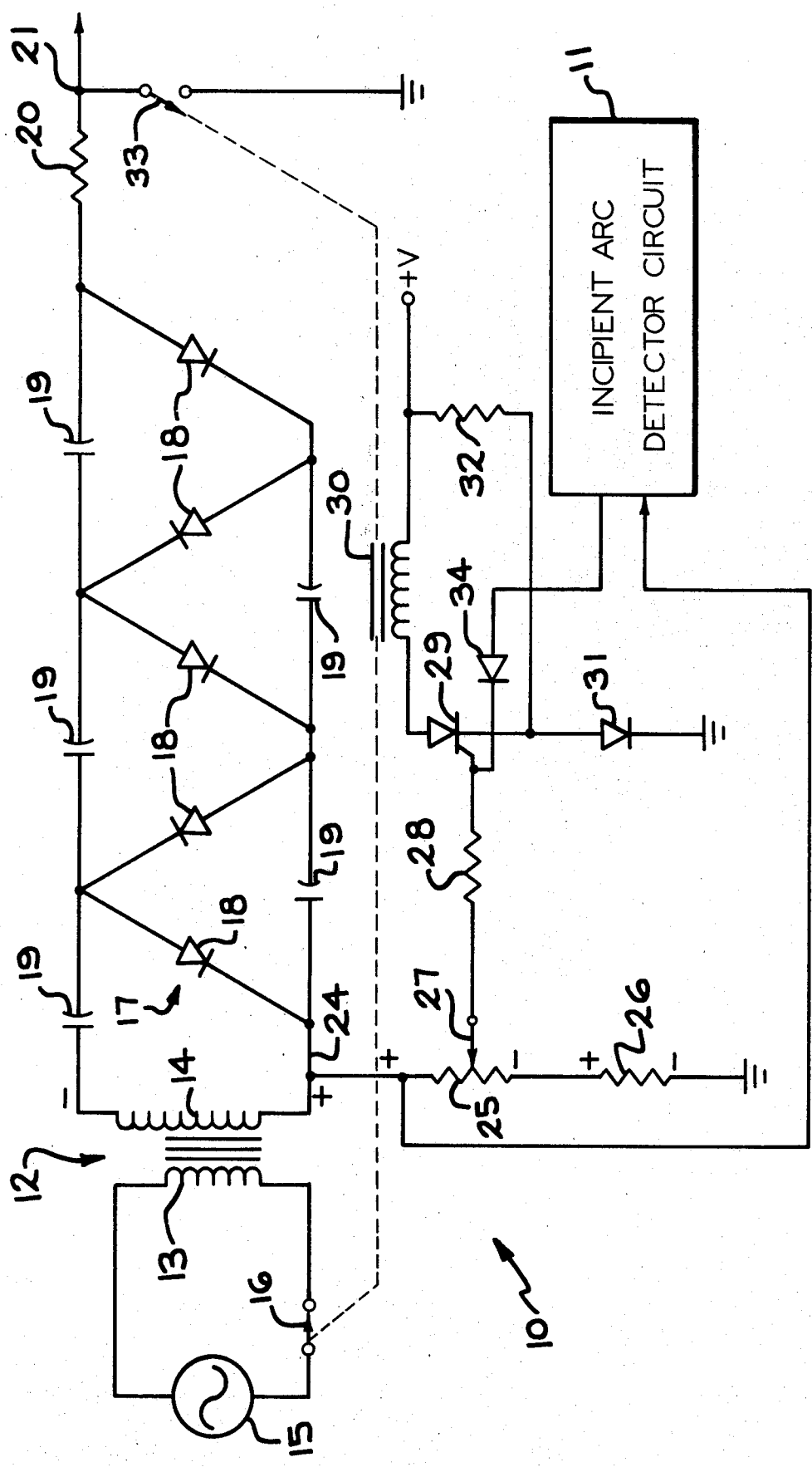
FIG. 1 is a schematic circuit diagram for a high voltage power supply constructed in accordance with the present invention.

Turning now to the drawings and particularly to FIG. 1, a simplified schematic circuit diagram is shown for a high voltage DC power supply 10 incorporating an incipient arc detector circuit 11 in accordance with the present invention. The power supply 10 includes a high voltage step up transformer 12 having a primary winding 13 and a secondary winding 14. An AC power source 15 is connected through a switch 16 to the primary winding 13. The AC power source 15 may be of any suitable type, such as a commercially available line source or, preferably, it may be in the form of an oscillator having an output at a frequency substantially higher than a commercial line source. For the following description, it will be assumed that the AC power source 15 is in the form of an oscillator having an output frequency on the order of 2000 Hz.

A high voltage alternating current appears across the secondary winding 14. This voltage is applied through the voltage multiplier ladder network 17 formed from a plurality of diodes 18 and capacitors 19. The high voltage output from the network 17 is applied through a current limiting resistor 20 to a terminal 21 which is connected through a suitable high voltage cable (not shown) to electrostatic coating apparatus (not shown) or to some other electrostatic system. The voltage appearing on the terminal 21 may be at any desired level and typically is at a level within the range of from perhaps 40 KV to 150 KV.

During electrostatic coating, it is normal to electrically connect the workpiece or object to ground and to charge the coating material to a high negative or positive voltage relative to ground. A side 24 of the secondary transformer winding 14 is connected through the fixed terminals of a potentiometer 25 and a resistance 26 to electrical ground. Current flowing from the high voltage terminal 21 must return through a ground loop including the resistance 26 and the potentiometer 25. As a consequence of the current flow through the resistance 26 and the potentiometer 25, a voltage appears between a tap 27 on the potentiometer 25 and ground. This voltage forms a control signal which is proportional to the high voltage current. As the high voltage current increases when a grounded object is moved too close to the coating apparatus, the voltage appearing at the tap 27 will increase. The tap 27 is connected through a resistor 28 to a gate on a silicon-controlled rectifier (SCR) 29. A relay coil 30, the anode and cathode of the SCR 29 and a diode 31 are connected in series between a positive voltage source and ground. A resistor 32 is connected from the positive voltage source to between the cathode of the SCR 29 and the diode 31. When a sufficiently positive voltage is applied through the resistor 28 to the gate of the SCR 29, the SCR 29 conducts to energize the relay coil 30. By adjusting the setting of the potentiometer tap 27, the output current from the high voltage power source 10 at which the switch 29 is gated on may be adjusted. When the SCR 29 is gated on and the relay coil 30 is energized, the switch 16 is opened by the relay coil 30 to interrupt power to the transformer primary winding 13. At the same time, the relay coil 30 also closes a switch 33 to connect the high voltage output terminal 21 to ground.

The above-described circuitry provides high voltage for operating electrostatic coating apparatus and similar type devices and includes overcurrent protection for shutting off and grounding the high voltage output in response to a predetermined overcurrent condition. Such circuitry is known and has been commercially available in the prior art for many years. In accordance with the present invention, the incipient arc detector circuit 11 of the invention is connected through an isolation diode 34 to the gate on the SCR 29 for energizing the relay coil 30 to shut off the high voltage power supply 10 in response to a predetermined rate of change, or di/dt, in the current passing through the ground return loop which includes the resistance 26 and the potentiometer 25. The incipient arc detector circuit 11 also triggers the SCR 29 in response to very short duration current pulses which occur due to corona discharge immediately prior to arcing.

Figure 2:
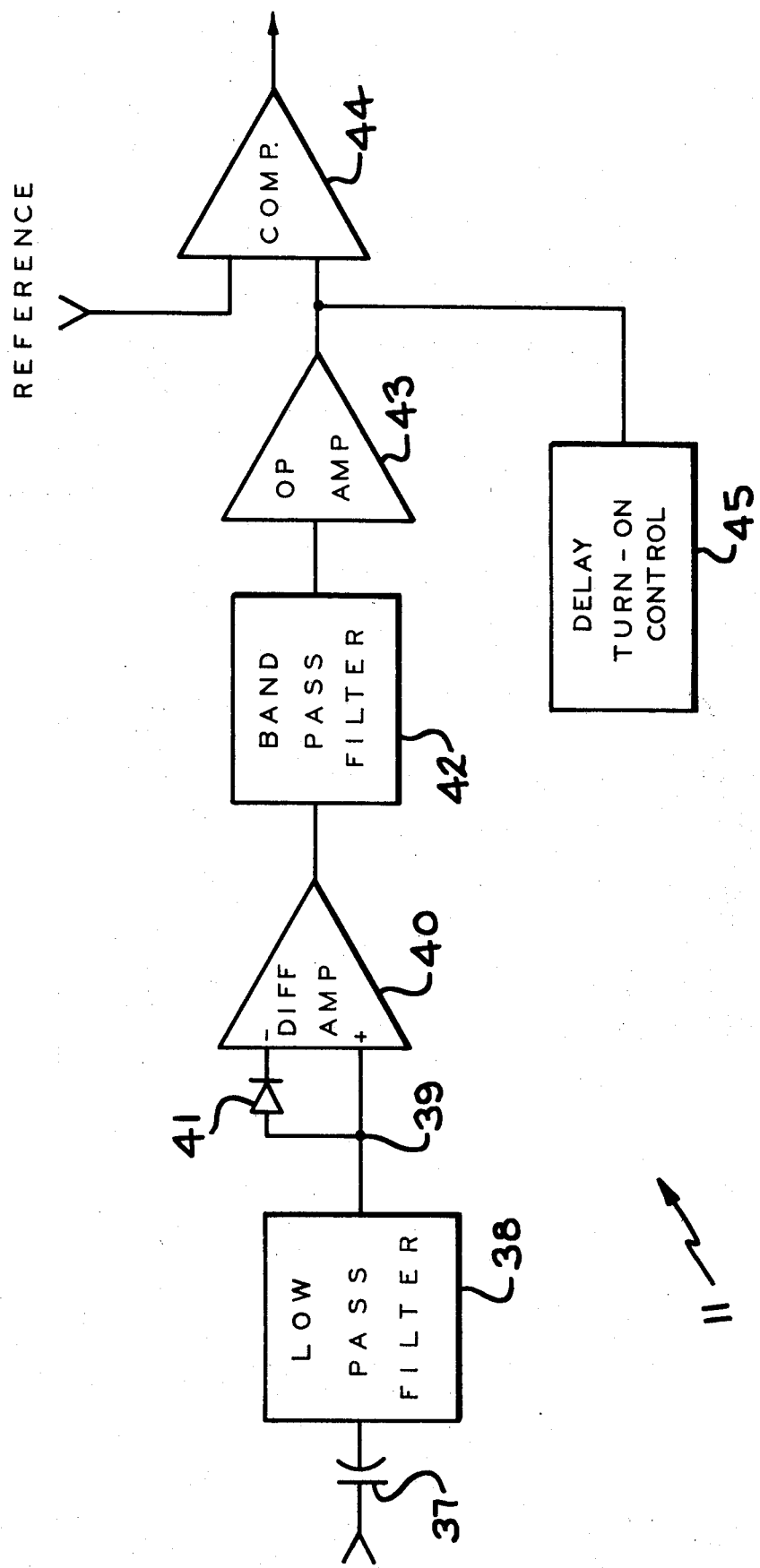
FIG. 2 is a block diagram for an incipient arc detector circuit constructed in accordance with the present invention.

Turning now to FIG. 2, a block diagram is illustrated for the incipient arc detector circuit 11. A voltage proportional to the current in high voltage DC circuit of the power supply 10 of FIG. 1 is applied to an AC coupling capacitor 37. This signal is primarily a DC voltage but also includes an AC component due to ripple on the output from the high voltage supply 10 and also includes noise such as occurs under incipient arcing conditions. The coupling capacitor 37 filters out the DC component and applies the remaining signal components through a low pass filter 38 to a junction 39. The low pass filter 38 functions to provide a quiescent DC voltage reference level of the AC component coupled through the capacitor 37. The low pass filter 38 also functions to eliminate high frequency and ringing noise from the signal. The signal on the junction 39 is applied directly to the non-inverting input of a differential amplifier 40 and also is applied through a diode 41 to the inverting input of the differential amplifier 40. The constant AC ripple occurring during normal steady state operation of the coating apparatus is cancelled out by the differential amplifier 40. The differential amplifier 40 has a clean, variable signal with variations in a positive direction above a base reference voltage which correspond to the movements of a grounded object in the vicinity of the high voltage coating apparatus.

The output from the differential amplifier 40 is passed through a band pass filter 42 which further refines the signal by removing extraneous interference signals not relative to the information carried in the signal and by referencing the output to a zero base voltage. From the band pass filter 42, the signal is amplified by an operational amplifier 43 and applied to one input of a comparator 44. The other input to the comparator 44 is connected to a preset DC reference voltage. So long as the output of the operational amplifier 43 is less than the magnitude of the reference voltage, the comparator 44 will have no output. When the output of the operational amplifier 43 exceeds the reference voltage, the comparator will generate an output which is applied to the gate on the SCR 29 (FIG. 1) for shutting down the high voltage power supply 10 in the manner described above.

During initial startup of the high voltage power supply 10, there will be a rapid rate of change in the current in the high voltage circuit of the power supply 10. The current level rapidly changes from no current to the steady state operating current. During this time, it is necessary to inhibit operation of the incipient arc detector circuit 11 since the circuit 11 will detect a rapid rate of current change or di/dt and shutdown the power supply 10. When the power supply 10 is initially turned on, a delay turn-on control 45 temporarily grounds the output from the operational amplifier 43 for the predetermined short period of time required for the output from the power supply 10 to stabilize. Typically, the output from the operational amplifier 43 may be inhibited for a time period of one second or less after the power supply 10 is turned on. After this short time interval, the output from the high voltage power supply 10 will have stablized sufficiently to allow operation of the incipient arc detector circuit 11.

Figure 3:
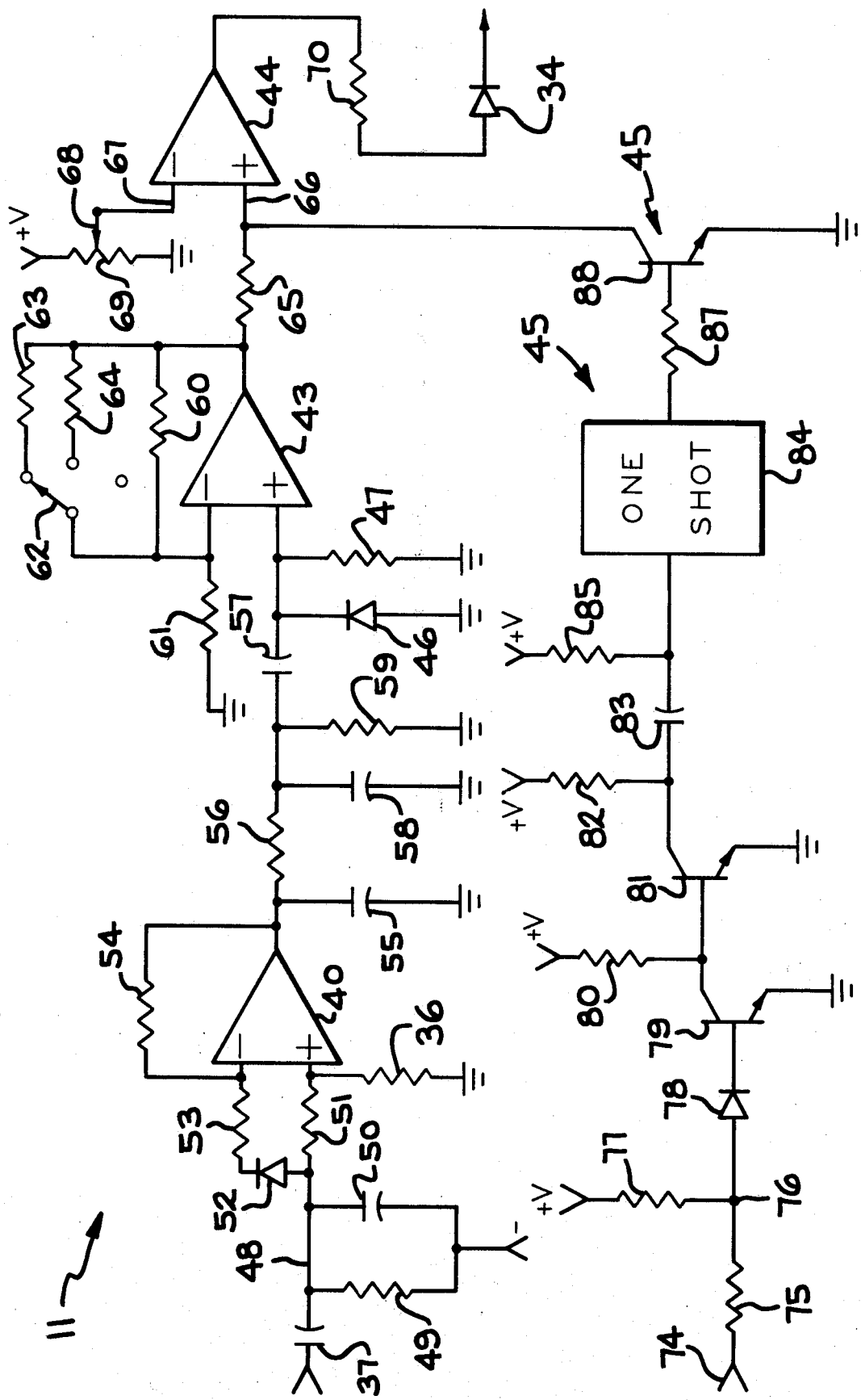
FIG. 3 is a detailed schematic circuit diagram for the incipient arc detector circuit of FIG. 2.

Turning now to FIG. 3, a detailed schematic circuit diagram is provided for the incipient arc detector circuit 11. In the description of FIG. 1, it was stated that a voltage proporational to the high voltage output current appeared across the resistance 26 and the potentiometer 25 in the ground return loop for the high voltage output from the power source 10. This voltage is applied through the AC coupling capacitor 37 to a junction 48. An optional resistor (not shown) may be connected in series with the capacitor 37 to minimize loading on the signal source. The low pass filter 38 generally comprises a resistor 49 and a capacitor 50 connected in parallel between the junction 48 and a small negative voltage source. The voltage from the source is applied through the resistor 49 the the junction 48 for providing a quiescent DC reference level for the AC component coupled through the capacitor 37. The junction 48 is connected through a resistor 51 to the non-inverting input of the differential amplifier 40, which generally comprises an integrated circuit operational amplifier. A resistor 36 connects the non-inverting input of the differential amplifier 40 to the ground. The junction 48 also is connected through a diode 52 and a resistor 53 to the inverting input of the differential amplifier 40. The differential amplifier 40 is provided with a negative feedback resistor 54 connected between its output and inverting input. The output of the differential amplifier 40 is applied to a capacitor 55 connected to ground and through a resistor 56 to an AC coupling capacitor 57 and thence to the non-inverting input of the operational amplifier 43. The junction between the resistor 56 and the capacitor 57 is connected through a capacitor 58 to ground and through an optional resistor 59 to ground. The capacitors 55, 58 and 57 and the resistors 56 and 59 form the band pass filter 42 which removes extraneous and nonrelevant information from the output of the differential amplifier 40. The coupling capacitor 57 functions to remove the DC component of the signal which appears at the output of the differential amplifier 40 so that the signal is referenced to ground. The junction between the capacitor 57 and the non-inverting input of the operational amplifier 43 is connected to ground through a parallel resistor 47 and diode 46. The resistor 47 provides a ground reference for the non-inverting input of the amplifier 43 while the diode 46 clamps the input to the amplifier 43.

The gain of the amplifier 43 is determined by a negative feedback resistor 60 connected between the output of the amplifier 43 and its inverting input and a resistor 61 connected between the inverting input of the amplifier 43 and ground. If desired, a multiple position switch 62 may be provided for selectively connecting one or more resistors, with two resistors 63 and 64 shown, in parallel with the resistor 60. By selectively switching one or more resistors in parallel with the resistor 60, the gain of the operational amplifier 43 is adjusted to adjust the sensitivity at which the circuit 11 shuts down the power supply 10. Preferably, the gain of the amplifier 43 is adjusted so that the circuit 11 has the maximum permissible sensitivity without triggering a false shutdown sequence during normal operation of the power supply 10 and the connected coating apparatus.

The output of the operational amplifier 43 is applied through a resistor 65 to one input 66 of the comparator 44. A second input 67 is connected to an adjustable reference voltage source which may comprise a tap 68 on a potentiometer 69 having fixed terminals connected between a regulated positive voltage source and ground. By adjusting the position of the tap 68, the reference voltage applied to the comparator input 67 is adjusted to set the signal level required on the comparator input 66 to initiate a shutdown sequence for the power supply 10. The output of the comparator 44 is applied through a series resistor 70 and the diode 34 to the gate of the SCR 29 to initiate shutdown of the power supply 10.

As previously mentioned under the discussion of FIG. 2, it is desirable to provide a delay turn-on control 45 for preventing automatic shutdown of the high voltage power supply 10 during initial current build up when the power supply 10 is first activated. A suitable signal is applied from the input to the power supply 10 to an input terminal 74 in FIG. 3. If, for example, the AC power source 15 (FIG. 1) comprises an oscillator having a DC power supply (not shown), the DC power supply will be switched to turn on and off the high voltage output from the power supply 10. The negative side of the switched DC power is applied to the terminal 74 for providing a control signal when the power supply 10 is switched on. The signal on the terminal 74 is applied through a resistor 75 to a junction 76 which is connected through a resistor 77 to a positive voltage source and also is connected through a diode 78 to the base of a transistor 79. The emitter of the transistor 79 is connected to ground and the collector is connected both through a resistor 80 to the positive voltage source and to the base of a second transistor 81. The emitter of the transistor 81 is grounded and the collector is connected both through a resistor 82 to a positive voltage source and through a coupling capacitor 83 to the clock input of a one shot multivibrator 84. The clock input of the multivibrator 84 also is connected through a resistor 85 to the positive voltage source. The output from the one shot multivibrator 84 is connected through a resistor 87 to the base of a transistor 88 which has a grounded emitter and a collector connected to the input 66 of the comparator 44.

In operation, when the AC power source 15 (FIG. 1) is shut off, no signal will be present on the input terminal 74. The transistor 79 will be in a conducting state and the transistor 81 will be in a nonconducting state. Also, the transistor 88 will be in a nonconducting state. When the power source 15 is initially activated, a negative DC signal is applied through the resistor 75 and the diode 78 to momentarily switch the transistor 79 to a nonconducting state. The positive voltage applied to the resistor 80 now turns on the transistor 81 to ground the junction between the resistor 82 and the coupling capacitor 83. This causes a signal to pass through the capacitor 83 to trigger the one shot multivibrator 84. Once triggered, the multivibrator 84 will have a pulse output for a preset time duration or pulse width which typically is less than one second. However, the time duration may be adjusted to whatever time interval is required for the high voltage output from the power supply 10 to stabilize. The pulse output from the multivibrator 84 biases the transistor 88 into conduction to ground the comparator input 66 during this predetermined time interval. Consequently, the comparator 44 will not respond to a signal from the amplifier 43 resulting from the rapid change in output current from the high voltage power supply during the interval timed by the multivibrator 84. If desired, circuitry may be provided for triggering the one shot multivibrator to cause the transistor 88 to momentarily inhibit operation of the circuit 11 at other times when there is a normal high di/dt, for example, when paint flow is discontinued in an electrostatic painting system.

In order to maintain optimum sensitivity and response in the incipient arc detection circuit 11 over different normal output loads for the high voltage power supply 10, it is desirable to provide for an automatic gain adjustment within the incipient arc detector circuit 11. With a fixed gain, there is a non-linear relationship between the signal which can be detected and the size, shape and material of a moving object which is to be detected. For these reasons, an automatic method of controlling the range of gain is desirable. When the quiescent current in the high voltage power supply is low, a high gain is desired to provide maximum sensitivity to moving objects. If the quiescent current increases at a slow rate, which is not a danger condition, then it is feasible to reduce the system gain such that normal current fluctuation in the routine spraying operation will not result in a false shutdown. This is accomplished by comparing the level of the quiescent current with numerous preset levels and, as the quiescent current increases through these preset levels, the gain factor for the main amplifier is automatically decreased in steps. Similarly, as the quiescent current decreases below the levels, the gain for the main amplifier will automatically take a step increase as each level is passed. This automatic gain control provides maximum sensitivity while minimizing the possibility of false shutdown.

Figure 4:
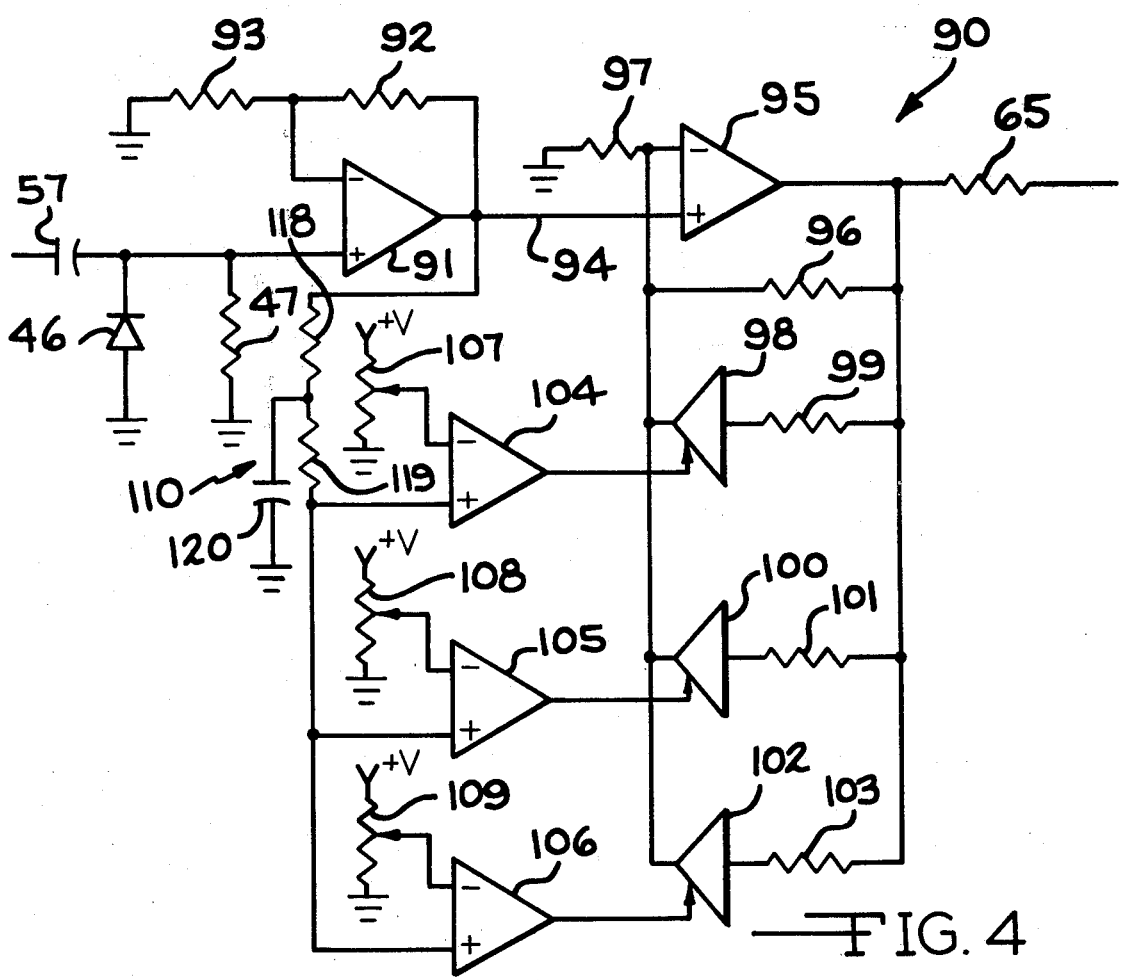
FIG. 4 shows a modification to a portion of the incipient arc detector circuit of the present invention.

An amplifier circuit 90 having step changes in the gain level is illustrated in FIG. 4. The circuit 90 is intended to be connected between the coupling capacitor 57 and the resistor 65 in FIG. 3 to replace operational amplifier 43. The capacitor 57, the diode 46 and the resistor 47 are connected to the non-inverting input of an operational amplifier 91 having a fixed gain determined by a negative feedback resistor 92 and a resistor 93. The amplifier 91 has an output 94 which is connected to the non-inverting input of an operational amplifier 95. The amplifier 95 is provided with a fixed negative feedback resistor 96 and resistor 97 connected from the inverting input to ground for establishing the maximum gain of the amplifier 95. A COS/MOS bilateral switch 98 and a series resistor 99 are connected in parallel with the resistor 96, a bilateral switch 100 and a series resistor 101 are connected in parallel with the resistor 96 and a bilateral switch 102 and a series resistor 103 are connected in parallel with the resistor 96. When the switches 98, 100 and 102 are selectively energized, the resistors 99, 101 and 103 are selectively connected in parallel with the resistor 96 to decrease the negative feedback resistance for the operational amplifier 95, in turn decreasing the gain of the amplifier 95. The output 94 from the amplifier 91 is connected through a low pass filter 110 comprising two resistors 118 and 119 and a capacitor 120 to the non-inverting inputs of three comparators 104, 105 and 106. The inverting inputs of the comparators 104 105 and 106 are connected, respectively, to taps of potentiometers 107, 108 and 109 each of which is connected between a positive reference voltage and ground. By selectively adjusting the taps on the potentiometers 107, 108 and 109, the average signal level at the amplifier output 94 which triggers each comparator 104, 105 and 106 is selectively established. The outputs of the comparators 104, 105 and 106 are connected, respectively, to trigger the bilateral switches 98, 100 and 102. Thus, when the average signal at the amplifier output 94 reaches a first level established by the potentiometer 107, the comparator 104 generates an output for triggering the switch 98 to connect the resistor 99 in parallel with the feedback resistor 96 to decrease the gain of the amplifier 95. Similarly, the potentiometer 108 is adjusted so that a predetermined high level average signal at the amplifier output 94 causes the comparator to trigger the switch 100 to connect the resistor 101 and parallel with the resistors 96 and 99 and the potentiometer 109 is set to a still higher level so that a still higher level average signal at the amplifier output 94 causes the comparator 106 to trigger the switch 102 to connect the resistor 103 in parallel with the three resistors 96, 99 and 101. Accordingly, the gain of the amplifier 95 decreases in step increments as the level of the signal at the output of the amplifier 91 increases through predetermined levels established by the settings of the potentiometers 107, 108 and 109. It will be appreciated that any desired number of steps can be provided.

Figure 5:
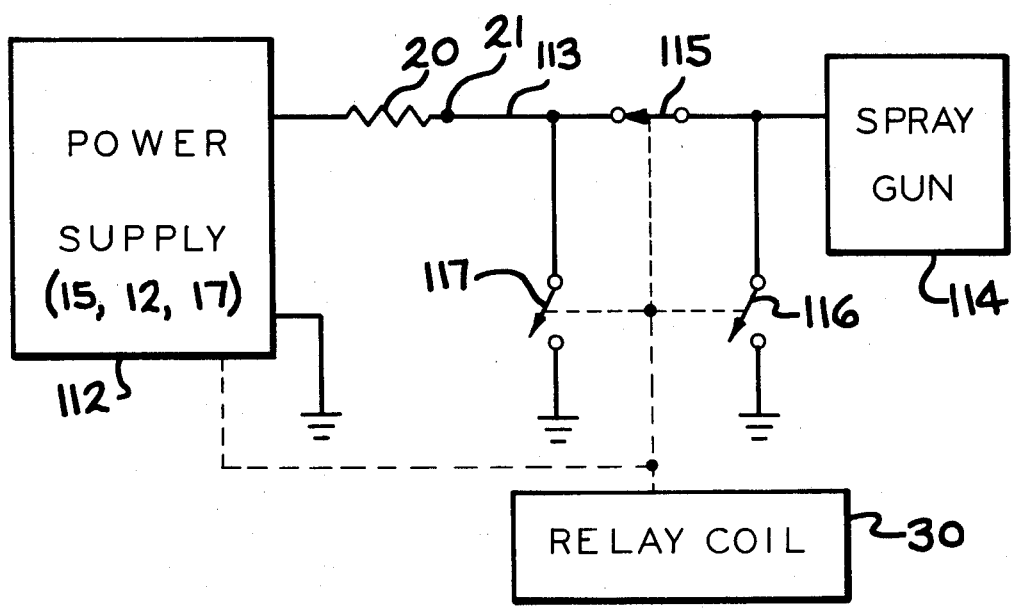
FIG. 5 is a block diagram showing a preferred embodiment of a safety high voltage grounding circuit for use in a high voltage DC power supply with the incipient arc detector circuit of the present invention.

In FIG. 1, the relay 30 was illustrated as opening a switch 16 to disconnect the AC power source 15 from the transformer primary winding 13 and also for closing a switch 33 to ground the high voltage output terminal 21. Where AC power source 15 comprises an oscillator driven from another power source, such as a direct current power source, the switch 16 may be located for removing power from the oscillator or at any other suitable location for interrupting the application power to the primary winding 13 of the high voltage step up transformer 12. For effective spark supression after recognition, it is necessary to remove the high voltage from the danger areas as rapidly as possible. FIG. 5 shows a circuit arrangement for providing maximum safety at the danger area, i.e., the spark zone adjacent to the coating apparatus. The high voltage power supply is generally illustrated by a block 112 which typically may incorporate the AC power source 15, the power transformer 12 and the ladder network 17 from FIG. 1. The output from the power supply block 112 is connected through the resistor 20 to the terminal 21 which in turn is connected through a high voltage cable 113 to an electrostatic spray gun 114 or other electrostatic coating apparatus. A normally closed relay switch 115 is located between the cable 113 and the spray gun 114. The switch 115 is located as close as possible to the spray gun 114 to minimize the capacitance on the spray gun side of the switch 115 when the switch 115 is open. A normally open relay switch 116 is connected from ground to between the switch 115 and the spray gun 114. A relay switch 117 is connected from ground to the high voltage cable 113. The relay coil 30 (FIG. 1) is connected to interrupt power to the primary winding of the high voltage transformer within the high voltage power supply block 112 and, simultaneously, to open the switch 115 and to close the two switches 116 and 117. When the switch 115 is opened and the switch 116 is closed, high voltage at the spray gun 114 is interrupted. By minimizing the capacitance of the high voltage circuit at the spray gun 114, electrostatic charge at the spray gun 114 is rapidly grounded when the switch 116 is closed. When the switch 117 is closed, high voltage remaining at the output of the power supply block 112 is dissipated through the current limiting resistor 20. The switches 115, 116 and 117 may be of any suitable type capable of handling the high voltages present at the spray gun 114 and also having as short as possible operating time.

It will be appreciated that various changes and modifications may be made to the above described perferred embodiment of a high voltage power supply with an incipient arc detection circuit. For example, it will be appreciated that the high DC output voltage may be generated with circuitry other than the combination of the transformer secondary winding 14 and the ladder network 17. The manner in which the high DC voltage is produced is not material to the present invention. It also will be appreciated that although the power supply 10 has been described for use with electrostatic coating apparatus, it is adaptable to other high voltage, electrostatic applications where there is a risk of arcing. Other modifications and changes will be apparent to those skilled in the art without departing from the spirit of the scope of the following claims.

What we claim is:

1. A control circuit for a high voltage DC power supply for an electrostatic system comprising means for generating a low voltage first signal proportional to the instantaneous high voltage current in the electrostatic system, such first signal including information on any incipient arcing condition in the electrostatic system, filter means for removing the DC component from such first signal to produce an AC second signal including the incipient arcing information, means for removing unwanted noise from such second signal to produce a third signal having a magnitude proportional to the rate of change of the high voltage current in the electrostatic system and including voltage impulses proportional to instantaneous current impulses in the high voltage electrostatic system due to incipient arcing, and means responsive to such third signal exceeding a predetermined voltage for removing high voltage from the electrostatic system prior to the occurrence of arcing.

2. A control circuit for a high voltage DC power supply for an electrostatic system, as set forth in claim 1, and wherein said means for removing unwanted noise from such second signal to produce a third signal includes differential amplifier means for removing any constant AC ripple from such second signal, and band pass filter means for removing unwanted low frequency and high frequency noise from such second signal.

3. A control circuit for a high voltage DC power supply for an electrostatic system, as set forth in claims 1 or 2, and further including means for inhibiting operation of said high voltage removing means for a predetermined time interval after said high voltage power supply is first energized to apply high voltage to the electrostatic system.

4. A control circuit for a high voltage DC power supply for an electrostatic coating system, as set forth in claims 1 or 2, and further including means for amplifying such third signal, means responsive to the magnitude of such third signal prior to amplification for automatically decreasing the gain of said amplifying means as such third signal increases above a predetermined level and for automatically increasing the gain of said amplifying means as such third signal decreases below such predetermined level, and wherein said high voltage removing means is responsive to such amplified third signal.

5. A control circuit for a high voltage DC power supply for an electrostatic system comprising means for generating a low voltage signal proportional to the instantaneous high voltage current in the electrostatic system, such signal including an AC ripple component and information on any incipient arcing condition in the electrostatic system, coupling capacitor means for removing the DC component from such first signal to produce an AC second signal including the incipient arcing information, means for providing a predetermined DC offset to such second signal, differential amplifier means having two inputs, a diode rectifier, means applying such offset second to one amplifier input and through said diode to the other amplifier input, said differential amplifier means removing AC ripple from such offset second signal to produce a third signal having a magnitude proportional to the instantaneous rate of change of the high voltage current in the electrostatic system, filter means for removing DC from such third signal, means for comparing such filter third signal with a predetermined reference voltage to establish a fourth signal when such filtered third signal exceeds such reference voltage, and means responsive to such fourth signal for removing high voltage from the electrostatic system.

6. A control circuit for a high voltage DC power supply for an electrostatic system, as set forth in claim 5, wherein said means for providing a predetermined DC offset to such second signal includes a low pass filter.

7. A control circuit for a high voltage DC power supply for an electrostatic system, as set forth in claim 5, wherein said filter means for removing DC from such third signal includes a band pass filter.

8. A control circuit for a high voltage DC power supply for an electrostatic system, as set forth in claim 5, and further including means for inhibiting said fourth signal for a predetermined timed interval after said high voltage power supply is first energized to apply high voltage to the electrostatic system.

9. A control circuit for a high voltage DC power supply for an electrostatic system, as set forth in claims 5, 6, 7 or 8, and further including an adjustable gain amplifier means for amplifying such filtered third signal, and wherein said comparing means compares such amplified filtered third signal to such predetermined reference voltage to establish such fourth signal.

10. A control circuit for a high voltage DC power supply for an electrostatic system, as set forth in claims 5, 6, 7 or 8, and further including means for amplifying such filtered third signal, means responsive to the magnitude of such third signal prior to amplification for automatically decreasing the gain of said amplifying means as such third signal increases above a predetermined level and for automatically increasing the gain of said amplifying means as such third signal decrease below such predetermined level, and wherein said comparing means compares such amplified filtered third signal to such predetermined reference voltage to establish such fourth signal.

* * * * *